(12) United States Patent
Chung et al.

(10) Patent No.: US 6,995,212 B2
(45) Date of Patent: Feb. 7, 2006

(54) FLAME RETARDANT, THERMOPLASTIC POLYCARBONATE MOLDING COMPOSITIONS

(75) Inventors: James Y. J. Chung, Wexford, PA (US); Winfried G. Paul, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/637,440

(22) Filed: Aug. 8, 2003

(65) Prior Publication Data

US 2005/0032980 A1 Feb. 10, 2005

(51) Int. Cl.
*C08L 69/00* (2006.01)
(52) U.S. Cl. ..................... 525/133; 525/439
(58) Field of Classification Search ............... 525/133, 525/439
See application file for complete search history.

(56) References Cited

U.S. PATENT DOCUMENTS

| | | | |
|---|---|---|---|
| 3,005,795 A | 10/1961 | Busse et al. | 260/45.5 |
| 3,028,385 A | 4/1962 | Schnell et al. | 260/47 |
| 3,294,871 A | 12/1966 | Schmitt et al. | 260/900 |
| 3,334,154 A | 8/1967 | Kim | 260/860 |
| 3,382,207 A | 5/1968 | Jaquiss | 260/45.7 |
| 3,647,747 A | 3/1972 | Bialous | 260/47.75 R |
| 3,733,295 A | 5/1973 | Martin et al. | 260/41.5 R |
| 3,751,400 A | 8/1973 | Crennan et al. | 260/47 XA |
| 3,775,367 A | 11/1973 | Nouverné | 260/45.9 R |
| 3,909,490 A | 9/1975 | Mark | 260/45.7 S |
| 3,917,559 A | 11/1975 | Mark | 260/45.7 S |
| 3,919,167 A | 11/1975 | Mark | 260/45.8 N |
| 3,926,908 A | 12/1975 | Mark | 260/45.7 S |
| 3,931,100 A | 1/1976 | Mark | 260/45.7 S |
| 3,933,734 A | 1/1976 | Mark et al. | 260/45.7 S |
| 3,940,366 A | 2/1976 | Mark | 260/45.9 R |
| 3,948,851 A | 4/1976 | Mark | 260/45.8 RW |
| 3,951,910 A | 4/1976 | Mark | 260/45.9 NC |
| 3,953,396 A | 4/1976 | Mark | 260/45.8 A |
| 3,953,399 A | 4/1976 | Mark | 260/45.85 H |
| 3,978,024 A | 8/1976 | Mark | 260/45.85 T |
| 4,066,618 A | 1/1978 | Mark | 260/45.85 T |
| 4,069,201 A | 1/1978 | Mark | 260/45.95 R |
| 4,208,489 A | 6/1980 | Schmidt et al. | 525/146 |
| 4,220,583 A | 9/1980 | Mark | 260/45.7 S |
| 4,391,935 A | 7/1983 | Bialous et al. | 524/82 |
| 4,469,833 A | 9/1984 | Mark | 524/161 |
| 4,499,262 A | 2/1985 | Fagerburg et al. | 528/279 |
| 4,579,906 A | 4/1986 | Zabrocki et al. | 525/72 |
| 4,626,563 A | 12/1986 | Ogoe et al. | 524/168 |
| 4,649,168 A | 3/1987 | Kress et al. | 524/130 |
| 4,656,227 A | 4/1987 | Lindner et al. | 525/133 |
| 4,666,972 A | 5/1987 | Köhler et al. | 524/504 |
| 4,753,994 A | 6/1988 | Carter, Jr. et al. | 525/146 |
| 4,767,821 A | 8/1988 | Lindner et al. | 525/72 |
| 4,778,848 A | 10/1988 | Trabert et al. | 525/66 |
| 4,810,739 A | 3/1989 | Lindner et al. | 524/371 |
| 4,983,658 A | 1/1991 | Kress et al. | 524/141 |
| 5,258,432 A | 11/1993 | Ogoe et al. | 524/141 |
| 5,773,493 A | 6/1998 | Bhatia et al. | 523/328 |
| 5,804,654 A | 9/1998 | Lo et al. | 525/67 |
| 5,849,822 A * | 12/1998 | Kido et al. | 524/159 |
| 6,066,694 A * | 5/2000 | Chisholm et al. | 525/67 |

FOREIGN PATENT DOCUMENTS

| | | | |
|---|---|---|---|
| EP | 0 899 303 | | 3/1999 |
| JP | 04-077550 | * | 3/1992 |
| JP | 2001131272 | * | 5/2001 |

* cited by examiner

*Primary Examiner*—David J. Buttner
(74) *Attorney, Agent, or Firm*—Joseph C. Gil; Aron Preis

(57) ABSTRACT

A flame-retardant thermoplastic molding composition is disclosed. The composition contains aromatic polycarbonate resin and sufficient amounts of poly(tetrafluoroethylene) and sulfo-modified polyester, that are effective to impart to the composition flame resistance that in accordance with UL-94 standard is rated V-0 at $\frac{1}{16}$" thick specimens.

8 Claims, No Drawings

FLAME RETARDANT, THERMOPLASTIC POLYCARBONATE MOLDING COMPOSITIONS

FIELD OF THE INVENTION

The invention relates to thermoplastic molding compositions and in particular to flame retardant polycarbonate compositions.

SUMMARY OF THE INVENTION

A flame-retardant thermoplastic molding composition is disclosed. The composition contains aromatic polycarbonate resin and sufficient amounts of poly(tetrafluoroethylene) and sulfo-modified polyester, that are effective to impart to the composition flame resistance that in accordance with UL-94 standard is rated V-0 at 1/16" thick specimens.

BACKGROUND OF THE INVENTION

Since the issuance of U.S. Pat. No. 3,028,365 in April of 1962, aromatic polycarbonate has become well known and accepted as a thermoplastic resin suitable for a wide variety of uses including injection molding, extrusion and film formation. The chemistry, synthesis, properties and applications of these polycarbonates are extensively discussed in Chemistry and Physics of Polycarbonates by Schnell, Interscience, 1964 and Polycarbonates by Christopher and Fox, Reinhold, 1962. Although polycarbonates have some inherent flame resistance, being self-extinguishing, ever more demanding requirements of flame-resistance have spawned numerous attempts to increase this property. Two general approaches have been followed.

One approach has been to add substantial amounts of halogen, particularly bromine or chlorine, to polycarbonate compositions. The halogen can be carried by polycarbonate polymer chains as in U.S. Pat. Nos. 3,751,400 and 3,334,154 or by a monomeric compound as in U.S. Pat. No. 3,382,207.

However, the presence of substantial amounts of halogen has been found to be detrimental to the properties of the polycarbonate and numerous additives such as those proposed in U.S. Pat. Nos. 3,647,747 and 3,733,295 have been proposed to overcome these detrimental effects.

Flame retardant polycarbonate compositions containing polytetra-fluoroethylene (PTFE) are known in the art. U.S. Pat. No. 4,391,935 discloses such compositions which also include certain salts. U.S. Pat. No. 3,294,871 disclosed a process for producing molding compositions containing PTFE and a thermoplastic polymer entailing blending the thermoplastic polymer with a latex of the PTFE to produce a dispersed, substantially homogeneous mixture of the PTFE and a thermoplastic polymer and recovering the composition by removing the volatiles therefrom. Among the polymers polycarbonates are listed at col. 3, lines 6–8. The disclosed compositions are said to offer advantages in terms of impact strength, melt index, coefficient of friction, low water permeability and increased HDT.

U.S. Pat. No. 3,005,795 discloses compositions containing PTFE resin in a form of finely divided microfibrous and submicrofibrous particles. Polycarbonates are disclosed at col. 3, lines 18–19 as suitable matrix.

The usage of any of a variety of salts—notably perfluoroalkane sulfonate salts of alkali metal or alkaline earth metal—with and without PTFE as a flame retardant for polycarbonate has been disclosed in U.S. Pat. Nos. 3,775, 367; 4,469,833; 4,626,563; 4,626,563; and 4,649,168. Alkali metal salts of sulfonic acids were disclosed in U.S. Pat. No. 4,469,833 to be flame retardant additives in the context of polycarbonate compositions containing structural units derived from thiodiphenol.

U.S. Pat. No. 4,220,583 disclosed flame retardant polycarbonate compositions containing partially fluorinated polyolefin and organic salts of alkali metal or alkaline earth metals. The salts include the ones disclosed in the following publications:

U.S. Pat. No. 3,933,734 which discloses a flame retardant polycarbonate composition comprising an admixture of an aromatic polycarbonate and a flame retardant additive which can be the metal salts of either monomeric or polymeric aromatic sulfonic acids, or mixtures thereof. U.S. Pat. No. 3,948,851 that discloses a flame retardant polycarbonate composition comprising an admixture of an aromatic polycarbonate and a flame retardant additive which can be the metal salts of either monomeric or polymeric aromatic sulfonesulfonic acids, or mixtures thereof.

U.S. Pat. No. 3,926,908 which discloses a flame retardant polycarbonate composition comprising an admixture of an aromatic polycarbonate and a flame retardant additive which can be the metal salts of sulfonic acids of aromatic ketones, or mixtures thereof. U.S. Pat. No. 3,919,167 which discloses a flame retardant polycarbonate composition comprising an admixture of an aromatic polycarbonate and a flame retardant additive which can be the metal salts of heterocyclic sulfonic acids, or mixtures thereof. U.S. Pat. No. 4,066,618 which discloses a flame retardant polycarbonate composition comprising an admixture of an aromatic polycarbonate and a flame retardant additive which can be the metal salts of a halogenated non-aromatic carboxylic acid or mixtures thereof. U.S. Pat. No. 3,909,490 which discloses a flame retardant polycarbonate composition comprising an admixture of an aromatic polycarbonate and a flame retardant additive which can be the metal salts of sulfonic acids of aromatic sulfides, or mixtures thereof. U.S. Pat. No. 3,953, 396 which discloses a flame retardant polycarbonate composition comprising an admixture of an aromatic polycarbonate and a flame retardant additive which can be the metal salts of either monomer or polymeric aromatic ether sulfonic acids, or mixtures thereof. U.S. Pat. No. 3,931,100 which discloses a flame retardant polycarbonate composition comprising an admixture of an aromatic polycarbonate and a flame retardant additive which can be the metal salts of aliphatic and olefinic sulfonic acids, and mixtures thereof. U.S. Pat. No. 3,978,024 which discloses a flame retardant polycarbonate composition comprising an admixture of an aromatic polycarbonate and a flame retardant additive which can be the metal salts of either monomeric or polymeric phenol ester sulfonic acids, or mixtures thereof. U.S. Pat. No. 4,069,201 which discloses a flame retardant polycarbonate composition comprising an admixture of an aromatic polycarbonate and a flame retardant additive which can be the metal salts of unsubstituted or halogenated oxocarbon acids, or mixtures thereof. U.S. Pat. No. 3,953,399 which discloses a flame retardant polycarbonate composition comprising an admixture of an aromatic polycarbonate and a flame retardant additive which can be the metal salts of sulfonic acids of monomeric and polymeric aromatic carboxylic acids and esters, and mixtures thereof. U.S. Pat. No. 3,917,559 which discloses a flame retardant polycarbonate composition comprising an admixture of an aromatic polycarbonate and a flame retardant additive which can be the metal salts of halocycloaliphatic aromatic sulfonic acids. U.S. Pat. No. 3,951,910 which discloses a flame retardant polycarbonate composition comprising an admixture of an aromatic polycarbonate and a flame retardant additive which can be the metal salts of either monomeric or polymeric aromatic amide sulfonic acids, or mixtures thereof. U.S. Pat. No. 3,940,366 which discloses a flame retardant polycarbonate composition comprising an admixture of an aromatic polycarbonate and a flame retardant additive which can be the metal salts of either monomeric or polymeric aromatic sulfonic acids, or mixtures thereof.

German published specification DE-OS 33 22 260 discloses PTFE co-precipitated with ABS and added to polycarbonate. Related technologies are disclosed in EP-OS 0,154,138 which disclosed a system entailing ABS and PTFE, DE-OS 34 17 476 which discloses the system of polyamides and PTFE and DE-OS 34 18 750 which concerns the system of ABS co-precipitated with PTFE. Also of relevance are DE-OS 34 20 002, DE-OS 34 22 862, DE-OS 35 12 638 (equivalent to EP-OS 0,174,493), DE-OS 29,48 439 and U.S. Pat. No. 4,208,489.

Also relevant in the present context is U.S. Pat. No. 4,753,994 which disclosed flame retardant polycarbonate compositions containing a co-precipitate of polycarbonate and fluoropolymer. Also relevant is EP 899 303 for its disclosure of a flame retardant polycarbonate composition which contains fluoropolymer resin particles that are encapsulated by thermoplastic SAN copolymer. U.S. Pat. No. 5,773,493 is noted here for its disclosure of a method of dispersing additives such as PTFE in a thermoplastic polymer and the use of the product of the inventive method in preparing molding compositions.

Translucent and flame-retardant polycarbonate compositions containing polycarbonate, a partially fluorinated polyolefin, and an organic alkali (or alkaline earth) metal salt were disclosed in U.S. Pat. No. 4,220,583.

EP-A-0,166,187 describes a powder composition containing PTFE. The powder is obtained by mixing a dispersion of PTFE with latex of grafted polymer, for example an acrylonitrile-butadiene-styrene grafted polymer, filtering and drying in order to obtain a powder.

U.S. Pat. No. 5,804,654 disclosed PTFE containing powder and free flowing PTFE that is at least partially encapsulated by a polymer or copolymer. Polycarbonate compositions that contain the PTFE and any of several flame-retardants additives have been disclosed.

DETAILED DESCRIPTION OF THE INVENTION

A flame-retardant thermoplastic molding composition is disclosed. The composition contains aromatic polycarbonate resin and sufficient amounts of poly(tetrafluoroethylene) and sulfo-modified polyester, that are effective to impart to the composition flame resistance that in accordance with UL-94 standard is rated V-0 at $\frac{1}{16}$" thick specimens. The amount of PTFE is at least 0.25%, preferably 0.25 to 2.0%, most preferably 0.3 to 1.0% and the amount of sulfo-modified polyester is at least 0.01%, preferably 0.05 to 1.0%, most preferably 0.1 to 0.8%, the percents being relative to the weight of the composition.

Suitable polycarbonate resins for preparing the composition of the present invention are homopolycarbonates and copolycarbonates, both linear or branched resins and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

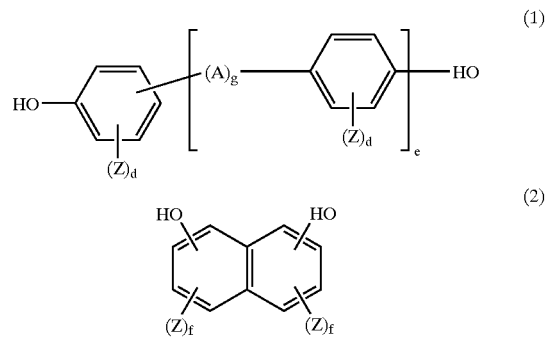

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

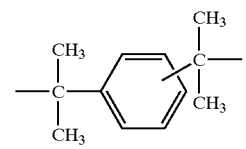

e and g both denote the number 0 to 1;
Z denotes F, Cl, Br or $C_1$–$C_4$-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxy-phenyl)-ethers, bis-(hydroxyphenyl)-ketones, bis-(hydroxy-phenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,401,826, 5,105, 004; 5,126,428; 5,109,076; 5,104,723; 5,086,157; 3,028, 356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)- propane, 2,2-bis-(3-chloro4-hydroxyphenyl)-propane, 4,4'-dihydroxy-diphenyl, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxy-phenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpoly-carbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514, incorporated herein by reference. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxy-phenyl)-2-(2,4-dihydroxy-phenyl)-propane and 1,4-bis-(4,4'-dihydroxytri-phenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention, such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein. The preferred polycarbonate resin in the present context contains in its molecular structure neither halogen nor units derived from thiodiphenol.

The use of PTFE as an anti-dripping agent is known—see for instance U.S. Pat. Nos. 4,391,935 and 5,102,696 both incorporated herein by reference. A suitable PTFE is characterized by having fibrillated morphology in the molded article to provide melt strength during the burning of the article. Suitable PTFE is commercially available from DuPont under the trademarks Teflon and from Dyneon, a 3M company as Dyneon PTFE.

Blends containing PTFE and a polymeric carrier such as were disclosed in German published specification DE-OS 33 22 260 (PTFE co-precipitated with ABS) and in U.S. Pat. No. 5,804,654—incorporated herein by reference that disclosed PTFE, which is at least partially encapsulated by a polymer or copolymer selected from the group consisting of polystyrene, poly-α-alkylstyrenes, styrene-acrylonitrile copolymers, α-alkylstyrene-acrylonitrile copolymers, acrylonitrile-butadiene-styrene copolymers, and their mixtures to form a free-flowing particulate matter. The encapsulating polymer or copolymer is obtained by emulsion polymerization of one or more monomers in the presence of PTFE latex. The preferred embodiments include polystyrene, poly(α-alkyl-styrenes), in particular poly(α-methylstyrene), vinyl polymers, in particular poly(vinyl chloride), poly(vinyl acetate), poly(methyl methacrylate), styrene-acrylonitrile, acrylonitrile-butadiene-styrene (ABS) copolymers, styrene-butadiene rubbers (SBR), and their mixtures. Most preferred are styrene-acrylonitrile copolymers (SAN). The proportion of PTFE is generally between 0.01 and 80% by weight with respect to the total weight of polymers in the blend, and preferably between 5 and 70% by weight. The polymer blend may be prepared simply by emulsion polymerization, preferably by radical route, of a monomer or a mixture of monomers in the presence of PTFE latex. Various emulsion-polymerization processes may be used to produce the encapsulation polymer, for example a discontinuous, semi-continuous or continuous emulsion. The term emulsion used in the present application denotes an emulsion alone or an emulsion-suspension. Suitable such blends are available in commerce from GE Plastics as Blendex 449.

The sulfo-modified polyester suitable in the context of the present invention is a linear, amorphous and water dispersible copolyisophthalate containing sodiosulfo substituents. The substituents are derived from 5-(sodiosulfo)-isophthalic acid. These polyesters may be prepared in accordance with the procedure disclosed in U.S. Pat. No. 4,499,262 and U.S. Pat. No. 5,646,237 both incorporated herein by reference.

Suitable sulfo-modified polyesters may be obtained from Eastman as AQ polymer grades 38S and 55S. The 38S and 55S are, respectively, based on 39 mole % and 41.3 mole % of isophthalic acid, 5.1 and 2.9 mole % of 5-(sodiosulfo)-isophthalic acid, 26.2 and 16.5 mole % of 1,4-cyclohexane-dimethanol, and 29.7 and 39.3 mole % of diethyleneglycol. The sodium contents derived from 5-(sodiosulfo)-isophthalic acid monomer, of 38S and 55S are 1.1 and 2% by weight, respectively. The 38S shows a glass transition temperature (Tg) of 35 to 38° C., while a Tg of 55S is 51 to 55° C.

The compositions in accordance with the invention may contain further additives known in the polycarbonate art for their function and utility, including reinforcing agents, fillers, stabilizers, dyes, pigments, plasticizers and release agents. The preparation of the compositions follow conventional procedures as is well known to the art-skilled.

The invention is further illustrated but is not intended to be limited by the following examples in which all parts and percentages are by weight unless otherwise specified.

EXAMPLES

Compositions in accordance with the invention were prepared and their properties evaluated. The makeup of the exemplified compositions and their properties are shown in the tables below.

In the preparation of the compositions the following components were used:

Polycarbonate (referred to below as PC): Makrolon 2608, a bisphenol-A based homopolycarbonate, a product of Bayer Polymers, having a melt flow rate of 10 g/10 min. as determined at 300° C./1.2 kG load in accordance with ASTM D1238.

PTFE was introduced to the compositions in the form of powdery PTFE/SAN blend, Blendex 449, a product of GE Specialty Chemicals, containing about 50 wt. % styrene-acrylonitrile (SAN) and 50 wt. % of PTFE, Sulfo-modified polyesters (referred to below as SMP): a product of Eastman available under the designation AQ 38S.

The compositions were prepared by conventional means and routine procedures that are well known the art-skilled.

TABLE 1

|  | 1 | 2 | 3 | 4 | 4A | 4B |
|---|---|---|---|---|---|---|
| PC, wt. % | 100 | 99.4 | 99.3 | 99.2 | 99.1 | 99.0 |
| PTFE, wt. % | 0 | 0.3 | 0.35 | 0.4 | 0.45 | 0.5 |
| SMP, wt. % | 0 | 0 | 0 | 0 | 0 | 0 |
| MFR, g/10 min. | 11.17 | 12.2 | 10.2 | 12.5 | 9.4 | 12.4 |
| Impact Strength, Izod notched, 1/8", ft-lb./in. | 16.4 | 17.5 | 18 | 17 | 19 | 17.1 |
| Flame Retardance UL94-V @ 1/16" | V2 | V2 | V2 | V0/F* | V1 | V1/V0 |

*F denoted failure

Adding to PC increasing amounts of PTFE impart sufficiently high flame retardance to the molded articles. PTFE additions to polycarbonate of up to 0.35 wt. % show no improvement and higher amounts yield inconsistent performance in evaluations according to UL-94 test on specimens having a thickness of 1/16". The flammability ratings of the compositions designated 4A and 4B represent an improvement over the remaining compositions yet the performance is deemed inconsistent.

TABLE 2

|  | 5 | 6 | 6A | 6B | 6C | 7 | 7A |
|---|---|---|---|---|---|---|---|
| PC, wt. % | 99.8 | 99.6 | 99.5 | 99.0 | 98.5 | 99.2 | 99.0 |
| PTFE, wt. % | 0 | 0 | 0 | 0 | 0 | 0.2 | 0.2 |
| SMP, wt. % | 0.2 | 0.4 | 0.5 | 1.0 | 1.5 | 0.4 | 0.6 |
| MFR, g/10 min. | 11.8 | 13.6 | 11.8 | 14.1 | 17.3 | 11.7 | 11.7 |
| Impact Strength, Izod notched, 1/8", ft-lb./in. | 18.3 | 18.6 | 17.0 | 17.6 | 14.1 | 17.1 | 17.3 |
| Flame Retardance UL94-V @ 1/16" | V2 | V2 | V2 | V2 | V2 | V1 | V2 |

Table 2 points to that the flame retardance of PC remains substantially unchanged upon the incorporation therewith of either SMP alone or with 0.2% PTFE.

TABLE 3

|  | 8 | 9 | 10 | 11 |
|---|---|---|---|---|
| PC, wt. % | 99.3 | 99.2 | 99.0 | 98.8 |
| PTFE, wt. % | 0.3 | 0.3 | 0.3 | 0.3 |
| SMP, wt. % | 0.1 | 0.2 | 0.4 | 0.6 |
| MFR, g/10 min. | 11.0 | 12.1 | 12.0 | 12.1 |
| Impact Strength, Izod notched, 1/8", ft-lb./in. | 16.4 | 17.0 | 17.3 | 17.5 |
| Flame Retardance UL94-V @ 1/16" | V-0 | V-0 | V-0 | V-0 |

As shown in Table 3, addition of 0.1 to 0.6% of SMP to PC containing 0.3% of PTFE imparts to the composition much improved flame retardance.

TABLE 4

|  | 12 | 13 | 14 |
|---|---|---|---|
| PC, wt. % | 99.1 | 98.9 | 98.7 |
| PTFE, wt. % | 0.35 | 0.35 | 0.35 |
| SMP, wt. % | 0.2 | 0.4 | 0.6 |
| MFR, g/10 min. | 10.4 | 10.8 | 11.3 |
| Impact Strength, Izod notched, 1/8", ft-lb./in. | 19.0 | 18.0 | 13.5 |
| Flame Retardance UL94-V @ 1/16" | V-0 | V-0 | V-0 |

The results shown in Table 4 demonstrate the improved flame retardance characterizing the inventive compositions.

TABLE 5

|  | 15 | 16 | 17 | 18 |
|---|---|---|---|---|
| PC, wt. % | 99.1 | 99.0 | 98.8 | 98.6 |
| PTFE, wt. % | 0.4 | 0.4 | 0.4 | 0.4 |
| SMP, wt. % | 0.1 | 0.2 | 0.4 | 0.6 |
| MFR, g/10 min. | 11.1 | 12.5 | 11.7 | 12.5 |
| Impact Strength, Izod notched, 1/8", ft-lb./in. | 16.3 | 17.3 | 17.7 | 16.9 |
| Flame Retardance UL94-V @ 1/16" | V-0 | V-0 | V-0 | V-0 |

The results shown in Table 5 demonstrate the improved flame retardance characterizing the inventive compositions.

TABLE 6

|  | 19 | 20 | 21 |
|---|---|---|---|
| PC, wt. % | 98.9 | 98.7 | 98.5 |
| PTFE, wt. % | 0.45 | 0.45 | 0.45 |
| SMP, wt. % | 0.2 | 0.4 | 0.6 |
| MFR, g/10 min. | 10.1 | 9.9 | 10.5 |
| Impact Strength, Izod notched, 1/8", ft-lb./in. | 16.0 | 13.0 | 12.0 |
| Flame Retardance UL94-V @ 1/16" | V-0 | V-0 | V-0 |

The results shown in Table 6 demonstrate the improved flame retardance characterizing the inventive compositions.

TABLE 7

|  | 22 | 23 | 24 |
|---|---|---|---|
| PC, wt. % | 98.8 | 98.6 | 98.4 |
| PTFE, wt. % | 0.5 | 0.5 | 0.5 |
| SMP, wt. % | 0.2 | 0.4 | 0.6 |
| MFR, g/10 min. | 10.7 | 10.3 | 10.1 |

TABLE 7-continued

|  | 22 | 23 | 24 |
|---|---|---|---|
| Impact Strength, Izod notched, 1/8", ft-lb./in. | 11.1 | 17.0 | 9.1 |
| Flame Retardance UL94-V @ 1/16" | V-0 | V-0 | V-0 |

The results shown in Tables 3–7 show the consistent and improved flame retardance characterizing the inventive compositions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flame-retardant thermoplastic molding composition having UL-94 flame resistance rating of V-0 at 1/16" thick specimens comprising aromatic polycarbonate resin, at least 0.25% poly(tetrafluoroethylene) and at least 0.01% to 0.8% of a linear, amorphous and water dispersible copolyester the acid-derived structural units of which consisting of isophthalic acid units and 5-(sodiosulfo)-isophthalic acid units, the percents being relative to the weight of the composition.

2. The composition of claim 1 wherein the amount of poly(tetrafluoroethylene) is 0.25 to 2.0% the percents being relative to the weight of the composition.

3. The composition of claim 1 wherein the amount of poly(tetra-fluoroethylene) is 0.3 to 1.0% the percents being relative to the weight of the composition.

4. The composition of claim 1 wherein the amount of sulfo-modified polyester is 0.05 to 0.8% the percents being relative to the weight of the composition.

5. The composition of claim 1 wherein the amount of sulfo-modified polyester is 0.1 to 0.8% the percents being relative to the weight of the composition.

6. The composition of claim 1 wherein the poly(tetrafluoro-ethylene) is a free-flowing powder blend which contains a tetra-fluoroethylene polymer that is at least partially encapsulated by at least one member selected from the group consisting of polystyrene, poly-α-alkylstyrene, styrene-acrylonitrile copolymer, α-alkylstyrene-acrylonitrile copolymer, acrylonitrile-butadiene-styrene copolymer, copolymers of styrene, alkyl acrylate, and alkyl methacrylate.

7. The composition of claim 6 wherein the member is styrene-acrylonitrile copolymer.

8. The composition of claim 6 wherein the blend contains about 50 wt. % of poly(tetrafluoroethylene) and 50 wt. % of by styrene-acrylonitrile copolymer.

* * * * *